United States Patent [19]

Anand et al.

[11] 4,264,750
[45] Apr. 28, 1981

[54] PROCESS FOR FLUORINATING POLYMERS

[75] Inventors: Madhu Anand, Cambridge; Raymond F. Baddour, Belmont; Robert E. Cohen, Jamaica Plain, all of Mass.

[73] Assignee: Massachusetts Institute of Technology, Cambridge, Mass.

[21] Appl. No.: 134,182

[22] Filed: Mar. 26, 1980

Related U.S. Application Data

[63] Continuation-in-part of Ser. No. 62,895, Aug. 1, 1979, abandoned.

[51] Int. Cl.$^3$ .......................... C08F 8/22; C08F 8/24; C08F 8/20
[52] U.S. Cl. .................... 525/356; 204/158 HA; 204/159.18; 204/159.19; 204/169; 525/343; 525/355; 525/359; 525/419
[58] Field of Search ............... 525/356, 355, 359, 343; 528/311; 204/158 HA, 159.18, 159.19, 169

Primary Examiner—William F. Hamrock
Attorney, Agent, or Firm—Arthur A. Smith, Jr.; Paul J. Cook

[57] ABSTRACT

Fluorinated low energy polymer surfaces are provided by fluorinating a hydrocarbon polymer with ions or radicals of fluorinated species in a cold plasma.

9 Claims, 4 Drawing Figures

NOTE: POINTS MARKED • ARE FOR FLUORINATIONS WITH NO PLASMA AT 1.0 MM
NOTE: POINTS MARKED ▲ ARE FOR FLUORINATIONS WITH NO PLASMA AT 2.0 MM

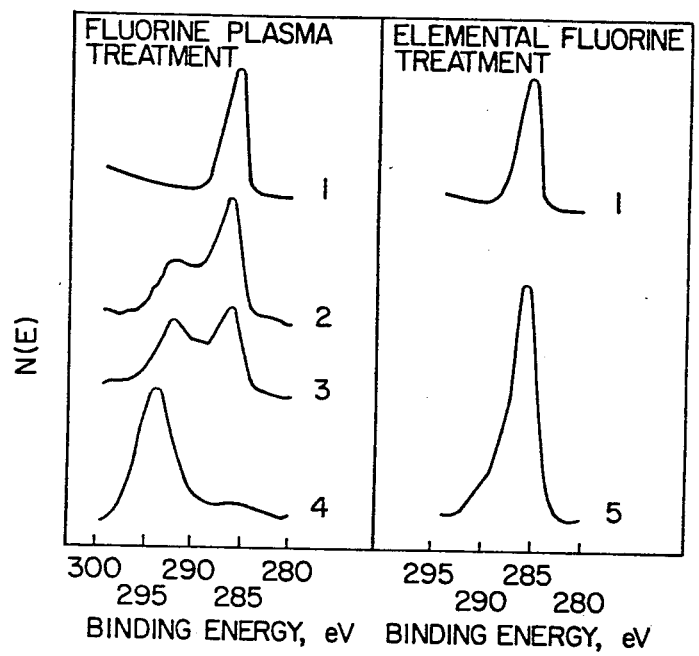
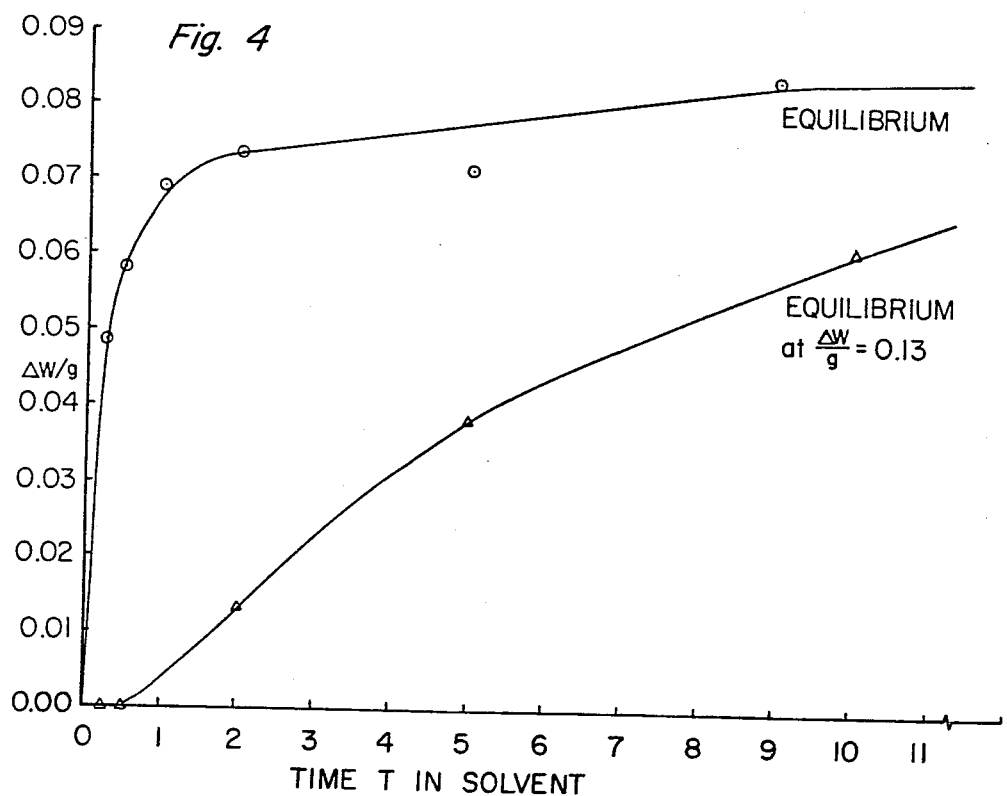
Fig. 3: $C_{1s}$ SPECTRA OF LDPE TREATED IN FLUORINE PLASMA AND ELEMENTAL FLUORINE.
(1) UNTREATED LDPE (2) FLUORINE PLASMA 15 SEC. (3) FLUORINE PLASMA 30 SEC. (4) FLUORINE PLASMA 300 SEC. AND (5) ELEMENTAL FLUORINE 300 SEC.

PROCESS FOR FLUORINATING POLYMERS

The Government has rights in this invention pursuant to Grant Numbers ENG 78-02388 and IPA-0010 awarded by the National Science Foundation.

REFERENCE TO RELATED APPLICATION

This application is a continuation-in-part of application Ser. No. 062,895, filed Aug. 1, 1979, now abandoned.

BACKGROUND OF THE INVENTION

The present invention relates to a process for fluorinating polymers to form low energy fluorinated polyolefin surfaces an to the fluorinated polymers so-produced.

Prior to the present invention, attempts have been made to fluorinate polyolefins such as polyethylene and polypropylene to form low energy surfaces of the type that characterize the Teflon-type polymers. These prior attempts have utilized fluorine gas generally at relatively high concentrations and in the substantial absence of species such as oxygen which compete with fluorine for the reactive sites on the polyolefin surface. Unfortunately, when utilizing fluorine under relatively mild conditions of temperature, pressure and fluorine concentration wherein polymer degradation is insubstantial, the reaction time to effect fluorination is relatively large; the resultant surface does not have the low energy desired due to the presence of oxygen thereon, as shown by Clark et al., Journal of Polymer Science; Polymer Chemistry Edition, Volume 13, pages 857–890 (1975). The products of prior fluorination procedures utilizing fluorine gas include a number of species containing only partial fluorine substitution of hydrogen. This also is undesirable since the presence of hydrogen tends to increase the free energy of the polymer surface.

Accordingly, it would be highly desirable to provide a means for substantially completely fluorinating a polymer in order to form a low energy surface. It would be desirable to provide such a means wherein the polymer substrate is not substantially degraded during fluorination. Furthermore, it would be desirable to provide such a means wherein the product contains substantially no oxygen bound thereto.

SUMMARY OF THE INVENTION

This invention is based upon the discovery that hydrocarbon polymers can be substantially completely fluorinated to generate low energy surfaces which contain little or no oxygen. These surfaces are formed by contacting a polymer with a cold plasma comprising fluorine-containing ions and radicals diluted in an inert gas. Reaction is conducted at a temperature, total pressure and fluorine concentration such that the desired fluorination is effected without substantial degradation of the polymer surface. By utilizing a cold plasma in accordance with this invention, fluorination of the polymer surface can be effected rapidly so that polymer degradation and reaction with oxygen are minimized or eliminated.

DESCRIPTION OF SPECIFIC EMBODIMENTS

Figure 1:
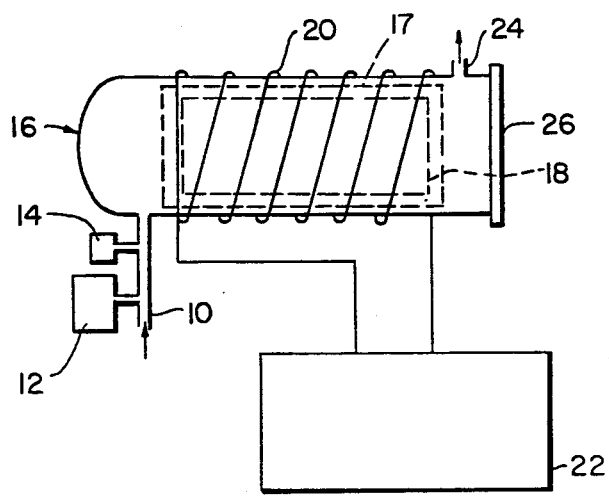

In accordance with this invention, the surface of a polymer is contacted with ions and/or radicals comprising fluorine and/or fluorinated carbon as a cold plasma. The cold plasma comprises a low power glow discharge formed by radio frequency excitation. The glow discharge comprises species such as ions and radicals of fluorine, carbon-difluoride and/or carbon-trifluoride. The source of the fluorinated ions and radicals, i.e., fluorine gas, sulfur hexafluoride, hexafluoroethane or tetrafluoromethane is passed through a reaction zone and is exposed therein to the radio frequency excitation. The reaction zone alone contains a polymer surface which is desired to be fluorinated. The glow discharge is maintained at a sufficiently high energy to form the desired fluorinated ions or radicals while at the same time avoiding high temperatures which would degrade the surface of the polymer being treated.

The plasma can be produced by any conventionally available means such as radio frequency excitation, microwave excitation or with electrodes. Suitable plasmas can be formed with a radio frequency discharge operating between about 10 kilohertz to 20 megahertz and about 10 to 500 watts or with a microwave discharge operating between about $10^4$ to $10^6$ megahertz and about 10 to 500 watts. These wattage considerations are based upon a 6 inch diameter reactor and may be increased for a larger reactor. The glow discharge utilized herein is fundamentally different from corona or arcing discharges which occur at higher pressures than employed in this invention. Thus, the cold plasma utilized herein effects surface changes under much milder conditions as compared to corona or arcing discharge.

The temperature at which reaction is effected is less than that which causes degradation to the polymer substrate while permitting substantially complete replacement of the hydrogen atoms on the substrate with fluorine from the plasma. It has been found that high concentration of fluorine causes degradation or spontaneous burning of the polymers. Therefore, in most instances, it is desirable to dilute the incoming feed comprising the source of the fluorine-containing radicals with an inert gas such as helium, argon, neon or the like. In addition, it has been found that at a given applied energy to the glow discharge an increase in total pressure within the reactor causes an undesirable corresponding increase in temperature. Accordingly, in order to control the reaction temperature, it is necessary to control the concentration of fluorine-containing radicals in the reactor as well as the total pressure within the reactor. Generally, significant degradation, e.g., depolymerization, of the polymer substrate begins at about 150° C. Therefore, in accordance with this invention, reaction is effected at a temperature less than about 50° C., preferably less than about 40° C. In order to achieve these desirable results, it is desirable that the total pressure within the reactor be maintained at less than about $19.55 \times 10^{-2}$ psig (10.0 mmHg), preferably less than about $7.74 \times 10^{-2}$ psig (4.0 mmHg) since higher total pressures result in undesirably high temperatures. In addition, the volume percent of the fluorine-containing source should be such that the partial pressure of the reactive fluorine species in the reaction be less than a level at which degradation of the polymer may occur due to the severity of the reaction conditions. In a preferred aspect of this invention, it is desirable to control the flow rate of the gas comprising the plasma since it has been found that by utilizing increased flow rates, the speed of the fluorination reaction is desirably increased. Therefore, it is desirable to utilize flow rates in excess of about 30 cm$^3$/min (STP), preferably in excess of about 45 cm$^3$/min (STP). The reaction is conducted substantially free of species such as oxygen or nitrogen which would react in competition with the fluorine-containing radicals or ions.

The process of this invention is useful to form low energy surfaces from polyethylene, polypropylene, polystyrene or polyisobutylene, polyamide, copolymers of ethylene and propylene or the like. By utilizing the technique of this invention, it is possible to provide low energy surfaces from relatively inexpensive polymeric materials rather than forming articles from relatively expensive fluoro-polymer species. The products obtained by the present invention comprise a low energy surface which is in the order of about 30 to 100 Angstroms thick rather than products which are fluorinated throughout their thickness. The process of the present invention provides novel products since the surface of the polymer is substantially completely fluorinated in that at least about 95% of the hydrogen atoms have been replaced with a fluorinated non-hydrogenated species to form a low energy surface, i.e., a surface having a surface free energy of less than about 20 dynes/cm, preferably less than about 18 dynes/cm. The low energy surface comprises a thickness of less than about 100 Angstroms. The remainder of the treated article comprises the original polymer since the interior portion of the articles has not been exposed to the cold plasma in accordance with this process.

In a preferred embodiment of this invention, the fluorination is carried out by placing the substrate in a metal cage, aluminum being the preferred metal for fluorine ion plasmas. It has been found that by conducting the reaction within the metal screen, ablation of the surface during reaction is considerably reduced. This permits obtaining a thicker surface of substantially completely fluorinated polymer as compared to the fluorinated surface formed without the cage. It is believed that the metal cage functions to isolate ions formed by cold plasma on the cage and prevent them from contacting the polyolefin surface while permitting fluorinated radicals formed by the cold plasma to react with the polymer surface. This absence of the reactive fluorine ions is believed to reduce ablation of the surface. When utilizing an aluminum cage, substantially completely fluorinated surfaces having a thickness up to about 200 Angstroms can be produced. The experiments can also be performed in an electrically grounded cage, referred to as a Faraday cage.

In another aspect of this invention, the surface of polymer particles can be fluorinated such as in a packed bed or in a fluidized bed formed wherein the gas containing the fluorinated reactant is passed through the bed of polymeric particles. The fluorinated gaseous reactant is subjected to a cold plasma under the conditions set forth above. Substantially complete surface fluorination can be obtained usually within about 5 to 10 minutes. The fluorinated particles then can be formed into an article by molding under pressure.

This invention will be more fully described with reference to the figure which is a schematic diagram of an apparatus useful for practicing the invention. As shown in the figure, a mixture of fluorine and an inert gas such as helium, argon, neon or the like is supplied to conduit 10 to which are connected a mass flow meter 12 and a vacuum gauge 14. The gas mixture enters quartz reaction chamber 16 which is provided with a quartz sample holder 18 and which is surrounded by an induction coil 20. A radio frequency oxcillator 22 is connected to induction coil 20. Typically, the quartz reaction chamber can be about 18 inches long having an outside diameter of about 6 inches. Prior to use, the reaction chamber 16 is evacuated, and thereafter, inert gas is allowed to pass through the chamber in order to remove trace quantities of oxygen. The fluorine-inert gas mixture is then allowed to flow into the chamber in order to carry out the reaction and is removed from quartz reaction chambr 16 through outlet 24 to be directed to a fluorine trap which is connected to the inlet of a vacuum pump (not shown). A suitable induction coil consisting of 10 turns of a 3/16 inch copper tubing forming a 6 inch diameter helix. The polymer to be treated is placed in quartz sample holder 18 and is exposed to the fluorine-inert gas mixture plasma for a suitable time to effect substantially complete fluorination. The position of the sample holder portion can be varied with respect to the coil, i.e., upstream or downstream of the coil depending upon the reaction conditions desired. Representative, exposure times are about ½ to 3 minutes at a reaction temperature of about 40° C., a total pressure of about $3.87 \times 10^{-2}$ psig and a fluorine concentration in the incoming gas mixture of about 5%. Required exposure times to effect substantially complete fluorination are correspondingly reduced with increased total pressure or flow rate and/or increased fluorine concentration. After the fluorine gas has been exhausted from reaction chamber 16, a gasket plate 26 is removed from reaction chamber 16 so that the treated polymer can be removed. When utilizing the aluminum cage, it can be placed within the quartz reaction chamber 16 so that it surrounds the polyolefin article being fluorinated.

The following examples illustrate the present invention and are not intended to limit the same.

EXAMPLE I

The apparatus shown in FIGURE 1, but without the Faraday cage 17, was utilized to carry out this example. It had a leak rate of atmospheric gases into the system upstream of the reactor of about $2 \times 10^{-8}$ std cc He/min. This is important since the presence of even small amounts of oxygen leads to severe oxidation on the surface of the polymers. The plasma is generated by a high frequency generator operating at a frequency of 13.56 MHz. Low density polyethylene (LPDE) film (about 50 micron thick) was treated.

In a typical run, the reaction chamber was evacuated for 12 hr after which dilute fluorine (5% $F_2$, 95% He) was introduced into the system. When the pressure in the chamber stabilized at the desired level (in about 2 min), the plasma was ignited and maintained for a specified treatment time after which the system was quickly flushed with helium at 10.0 mmHg. During reaction, total pressure in the reactor did not exceed $7.74 \times 10^{-2}$ psig and the temperature in the reactor did not exceed 40° C. The average flow rate of the dilute gas was varied as shown in Table I.

The surface analysis of the treated polymers was carried out using several complementary techniques. X-ray photoelectron-spectroscopy (XPS) or ESCA (Physical Electronics Model 548) was used extensively at low and high resolutions to obtain (i) an overall chemical analysis in terms of mole % species by measuring areas under the 1S peaks, (ii) an approximate estimate of depth of fluorination by using area ratios of $F_{1S}$ and $F_{2S}$ photoelectron peaks, (iii) identification of various fluorinated species by means of chemical shifts in the $C_{1S}$ spectra, (iv) indication of an "average" composition by measurement of the Auger parameter, and (v)

detailed chemical composition by deconvolution of the $C_{1S}$, $O_{1S}$, etc., spectra by means of a computer program using a non-linear least squares fit approach. In addition to ESCA, FTMIR IR spectroscopy was used to obtain information on surface chemical groups. A variable angle MIR attachment (Wilks Scientific Model 50) was used in an attempt to obtain the depth profile of surface fluorination.

Additional information was obtained by measuring the advancing contact angle using various well characterized liquids. This method enables obtaining values of the polar and dispersion components of the surface energy.

Finally, the effectiveness of the fluorinated surface to serve as a solvent barrier was investigated by a solvent diffusion technique. In this experiment, the fluorinated specimen is immersed in a solvent (p-xylene, 25° C.) for a time t, removed and dried quickly between two sheets of filter paper and weighed. The increase in weight of the film is associated with the amount of solvent that has diffused into the polymer. The non-equilibrium solvent uptake behavior provides information on the solvent barrier property of the treated polymer.

Reactions of polyethylene with a diluted fluorine plasma have revealed several important features in this experiment.

Figure 2:
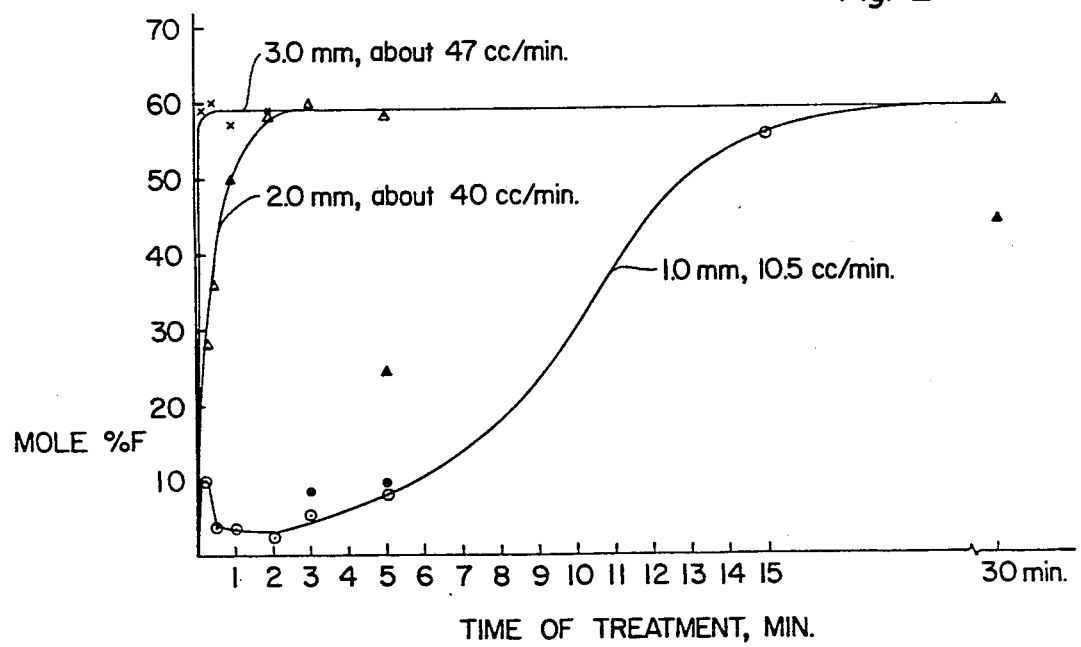

(i) Reaction of plasma-activated fluorine species with carbon from LDPE is very rapid with significant extent of surface fluorination taking place in times as short as 15 seconds depending on the pressure in the reaction chamber and the flow rate of the gas. At higher pressures (2 and 3 mmHg) and flow rates (35–45 cc/min), the extent of reaction with elemental fluorine is considerably lower as compared to the reaction in the plasma formed from the dilute fluorine gas stream for the same treatment times [FIG. 2].

(ii) At lower pressures (1 mmHg) and flow rates (about 10 cc/min), the surface reaction appears to be slow with plasma-activated fluorine. Experimental results show that greater amounts of fluorine containing species are found for reactions with elemental fluorine (no plasma) in the small time scale regions. This is surprising because reactivity of the fluorine is greatly enhanced by the plasma as observed for experiments at 2 and 3 mm of pressure. This suggests that a competing ablation process might be taking place. In fact, for the first five minutes of plasma treatment, there is no significant change in the fluorine content on the surface as observed by ESCA measurements [FIG. 2].

(iii) Treatment with elemental fluorine (no plasma) leads to formation of several intermediate species such as $CHF-CH_2$, $CHF-CHF$, $CH_2-CF_2$. With the fluorine plasma of this invention, the dominant species on the surface are $-CF_2$ type even at the smallest reaction times employed. This is determined by means of chemical shifts in the $C_{1S}$ spectrum from high resolution ESCA, with typical spectra shown in [FIG. 3].

(iv) There appears to be little effect of power on the extent of fluorination in the range of 25–100 W power in the reactions studied.

(v) Flow rate of the gas in the system (at a constant pressure) seems to have significant effect on the extent of fluorination as shown in Table I. Reductions in fluorination are observed at lower flow rates.

(vi) For reaction times smaller than those required to achieve complete surface prefluorination, there appears to be a post-reaction with oxygen. It is possible that there are some trapped radicals in the subsurface layers or some unreacted bonds on the surface which post-react with oxygen on exposure to atmosphere or by reaction with small traces of oxygen present in the system. This is not observed in the case of full fluorination (i.e., reaction goes to completion) where even some small decreases in the surface oxygen contents are observed. [Table 2].

TABLE I
EFFECT OF FLOW RATE ON EXTENT OF
FLUORINATION AT 2.0 mm REACTION PRESSURE

| Time of Treatment Sec. | Power W | Flow Rate cc/min | Mole % F From ESCA |
|---|---|---|---|
| 15 | 50 | 27 | 4.9 |
| 15 | 50 | 33 | 24.0 |
| 15 | 50 | 40 | 28.5 |
| 30 | 50 | 33 | 34.7 |
| 30 | 50 | 40 | 39.0 |

TABLE 2
TYPICAL CHARACTERIZATION OF SOME 16 POLYETHYLENE SURFACES

| Run | | Mole % F | Mole % O | Mole % C | Species Identified from ESCA Spectra | Contact Angle** | Auger Parameter*** (Aα) |
|---|---|---|---|---|---|---|---|
| 1. | Untreated Polyethylene | 0.0 | 5.3 | 94.7 | $-CH_2-CH_2$, $O=C<$(*) | 71° | — |
| 2. | Plasma 15 sec, 1.0 mm, 50 W | 10.5 | 10.6 | 78.9 | $-CH_2-CH_2$, $CH_2-CF_2-CH_2$, $O=C<$ | ~54° | 1342.1 |
| 3. | 300 sec. 1.0 mm, 50 W | 8.5 | 19.6 | 72.0 | $-CH_2-CH_2-$, $CH_2-CF_2-CH_2-$, $O=C<$ | ~10° | 1342.1 |
| 4. | 15 min, 1.0 mm, 50 W | 56.0 | 5.5 | 38.5 | $-CH_2-CH_2$, $CF_2-CF_2$, $C=O$ | 90–91° | 1341.1 |
| 5. | 30 sec, 2.0 mm, 50 W | 36.0 | 8.2 | 55.8 | $-CH_2-CH_2-$, $CH_2-CF_2-CH_2$, $O=C<$ | ~20° | — |
| 6. | 180 sec, 2.0 mm, 50 W | 60.7 | 4.8 | 34.5 | $-CF_2-CF_2-$. $CH_2-CF_2-CH_2$, $-CH_2-CH_2$, $O=C<$ | 91–93° | — |
| 7. | 300 sec, 2.0 mm, 50 W | 61.8 | 3.6 | 34.6 | $-CF_2-CF_2$, $-CH_2-CH_2$, $O=C<$ | 94–96° | — |
| 8. | 30 sec, 3.0 mm, 50 W | 60.5 | 5.0 | 34.5 | $-CF_2-CF_2-$, $-CH_2-CH_2-$, $O=C<$ | ~91° | 1341.4 |
| 9. | 60 sec, 3.0 mm, 50 W | 56.6 | 3.3 | 40.1 | $-CF_2-CF_2-$, $-CH_2-CH_2-$, $O=C<$ | 93–94° | 1341.1 |
| 10. | 300 sec, 2.0 mm, 0 (no plasma) | 26.4 | 7.2 | 66.4 | $-CH_2-CHF-CH_2-$, $CHF-CHF-$, $CH_2-CH_2-$, $O=C<$ | ~52° | — |
| 11. | Polytetrafluorethylene (Chemplast) | 61.0 | 1.3 | 37.7 | $-CF_2-CF_2-$ | 91–93° | 1340.8 | from FTMIR
**advancing contact angle with Formamide
***Auger parameter = $B.E._{F1S} - B.E._{F2S} + hv_{MgK\alpha}$
Aα 1342 average composition CF
Aα 1341 average composition $(CF2)_n$ Based on the values of contact angle obtained for the plasma treated samples, the outermost surface of the polyethylene is fully fluorinated. The absence of measurable amounts of partially fluorinated carbon atoms for plasma-treated samples, as determined by ESCA, further supports this hypothesis. There is also some evidence for the presence of $CF_3$ species in these treated samples owing to the fact that the values of contact angle exceed the value of 91° (with formamide) associated with polytetrafluoroethylene. Further, for highly fluorinated samples, there is a likelihood for the presence of a small —$CF_3$ type peak as seen in FIG. 3(4).

For plasma treated samples, there is a residual —$CH_2$—$CH_2$—ESCA signal even after long treatment times (about 30 min.). This suggests that the fluorination has not penetrated beyond about 40 A, and that the ESCA probe (typically sampling the first 50 A layer) can penetrate somewhat beyond the depth of perfluorination. Further, the calculations from areas ratios of $F_{1S}$ and $F_{2S}$ peaks suggest fluorination thicknesses which are in this range for the fully fluorinated specimens. Typical results are shown in Table 3. Also, the FTMIR experiments (typically sampling about the first 10000 A layer) show very small signals for fluorine species indicating a very thin fluorinated layer. One possible reason for this thin layer may be the simultaneous etching and chemical reation taking place, thus continually ablating material from the surface. Interestingly, in long-time plasma treatment experiments, some sticky polymeric residue was found near the reactor exit which seemed to be a partially fluorinated low mol. wt. polyethylene as indicated by IR measurements. Further, small decreases in sample weights (0.1%) after plasma treatment also indicated the same. SEM results do not seem to be conclusive. There is a decrease in surface roughness with plasma treatment. This is unexpected because etching would normally show an increase in surface roughness. Another reason for this ultra-thin layer may be that the presence of a cross-linked fluorinated surface which prevents or retards further diffusion of fluorine into the bulk. Much lower extents of fluorination at lower pressures (1.0 mm), where partial pressure of fluorine is reduced further, may support this hypothesis. The fluorinated layer produced in the plasma retards the rate of solvent uptake as indicated by the results of the experiments on the diffusion of p-xylene into untreated and plasma treated LDPE. Based on preliminary results, it appears that the rate of diffusion is reduced by a factor of about twenty. There is also evidence for an "induction period" during which little or no diffusion into the treated samples takes place [FIG. 4].

Thus, activation of fluorine molecules in the plasma leads to rapid fluorination of LDPE to a depth of about 40 A as observed by ESCA and FTMIR measurements with no further increase in fluorination as a function of time. Simultaneous removal of the surface material is the likely cause of this. By-product formation and weight loss measurements further support the hypothesis. Based on contact angle measurements, the solid interface appears to be fully fluorinated with some indication of terminal $CF_3$ sites. Most importantly, the plasma reaction quickly leads to the formation of $CF_2$ groups on the surface suggesting a reaction mechanism significantly different from that of fluorination with elemental fluorine.

TABLE 3

APPROXIMATE VALUES OF DEPTH OF FLUORINATION FOR SOME TREATED POLYETHYLENE FILMS

| Flow Rate cc/min | Reaction Conditions | | | Mole % F | D,A |
|---|---|---|---|---|---|
| | Time | Pressure | Power | | |
| 10.5 | 3 min | 1.0 mm | 0 (no plasma) | 8.8 | 6 |

TABLE 3-continued

APPROXIMATE VALUES OF DEPTH OF FLUORINATION FOR SOME TREATED POLYETHYLENE FILMS

| Flow Rate cc/min | Reaction Conditions | | | Mole % F | D,A |
|---|---|---|---|---|---|
| | Time | Pressure | Power | | |
| 10.5 | 5 min | 1.0 mm | 0 (no plasma) | 9.3 | 11 |
| 40 | 30 min | 2.0 mm | 0 (no plasma) | 44.0 | 60 |
| 10.5 | 15 sec | 1.0 mm | 50 W | 10.5 | 4.5 |
| 40 | 30 sec | 2.0 mm | 25 W | 35.0 | 11 |
| 40 | 60 sec | 2.0 mm | 25 W | 57.0 | 29 |
| 40 | 30 min | 2.0 mm | 25 W | 60.4 | 29 |
| 47 | 15 sec | 3.0 mm | 50 W | 59.2 | 37 |
| 47 | 30 sec | 3.0 mm | 50 W | 60.5 | 35 |
| 47 | 60 sec | 3.0 mm | 50 W | 56.6 | 44 |
| 47 | 2 min | 3.0 mm | 50 W | 58.6 | 19 |

Utilizing the process of this example, fluorinated polypropylene and polyamide (Nylon 66) were obtained.

EXAMPLE II

This example illustrates the use of the aluminum cage and a comparison of the thickness of a fluorinated surface produced with or without the metal cage.

Utilizing the apparatus of FIG. 1 with a ⅛ inch mesh aluminum screen 17 inside the quartz reactor, a 0.5 mm thick film of polyethylene was subjected to the conditions set forth below. The reactant gas comprised a fluorine/helium mixture, (5% fluorine by volume) at a flow rate of 40 cc/min and a pressure of 30 mmHg. The power supplied to the cold plasma was 50 W. The results are set forth in Table 4.

Of the various reaction conditions studied, namely pressure, power, flow rate and time of treatment, the last two have the most dramatic effect on the extent of fluorination as determined by ESCA and contact angle measurements. Similar trends were observed for reactions and 1 mm and 3 mmHg. Typical values are shown below in Table 5. In addition to the results shown in Table 5, we noted that at high flow rates, the reaction time required to achieve perfluorination at the surface was reduced considerably; for example, only 15 seconds were required to achieve a surface with 93° contact angle when a flow rate of 47 cc/min was employed at 3 mmHg pressure. The effect of flow rate may be related to formation and removal of HF species. Formation of HF could lead to an effective reduction in the concentration of active F species near the surface, resulting in a reduced reaction rate. At higher flow rates such rate limiting species would be more readily swept away from the surface.

TABLE 4

| Time of Treatment Min | Atomic % From ESCA | | | Approximate Depth of Fluorination, A from ESCA |
|---|---|---|---|---|
| | F | C | O | |
| 2 | 50.3 | 42.0 | 7.3 | 30 |
| 5 | 54.9 | 40.3 | 4.8 | 38 |
| 15 | 60.4 | 37.5 | 2.0 | >60 |
| 60 | 58.9 | 37.1 | 4.1 | 59 |
| 60* | 58.6 | 37.3 | 4.1 | 35 |

*No aluminum cage; only plasma

TABLE 5

EFFECT OF FLOW RATE ON CONTACT ANGLE WITH FORMAMIDE AT 3.0 mmHg AND 50 W POWER

| Treatment Time = 1 min | | Treatment Time = 2 min | |
|---|---|---|---|
| Flow rate cc/min | Contact Angle θ | Flow rate cc/min | Contact Angle |
| 47 | 93.5° | 47 | ~96° |
| 40 | 91.5° | 40 | 92° |
| 30 | ~22.0° | 30 | 91° |
| 20 | ~14.5° | 20 | ~13° |
| 10 | ~50.0° | 10 | ~34° |

When the polymer samples were enclosed in the metal cage, a decrease in rate of reaction was observed as determined by the slow buildup of the contact angle as shown in Table 6.

TABLE 6

EFFECT OF TREATMENT TIME IN THE ALUMINUM CAGE ON CONTACT ANGLE WITH FORMAMIDE AT 3.0 mmHg, 50 W, 40 cc/min

| Time of Treatment min | Contact Angle θ |
|---|---|
| 2 | ~47 |
| 5 | ~75 |
| 15 | 95* |
| 60 | 93* |

*Constant after 3 months.

An increase in depth of fluorination was found as determined by an increase in the intensity of the infrared band in the 1300–1100 cm$^{-1}$ range associated with —$CF_2$ groups. However, there seemed to be an upper limit on the intensity of this band as observed from long-time experiments. It appears that after the initial rapid fluorination with the active species, the propagation into the bulk takes place by a diffusion mechanism similar to that for the elemental fluorine.

The question of the chemical stability of the fluorinated layer is important, and what we find is that contact angles with formamide on films do not vary with time for the surface prefluorinated specimens prepared both with and without the aluminum cage.

EXAMPLE III

This example illustrates the process of this invention utilizing a fluidized bed. Powders are treated in a vertical pyrex tube with a fritted glass bottom to support the powders. A nickel mesh near the reactor exit prevents the overflow of powders. The powder bed is fluidized at a reduced pressure in the range of about 10 mmHg (reaction pressure). The powders, obtained by cryogenic grinding of DOW polyethylene (Resin 120) pellets, have a specific surface area of ~0.15 m$^2$/g as determined by BET measurements.

The surface analysis of the treated polymers is carried out using ESCA. Thermal properties of the powders in the range of 350° to 650° K were studied on a Perkin Elmer DSC II, differential scanning calorimeter.

We found that the surface properties were altered significantly as determined by ESCA measurements and the molding conditions of the plasma fluorinated polymers. However, as shown by DSC experiments, the treated powders showed no change in the bulk melting temperature and the thermal response to 650° K. as compared to the untreated polymers.

What we claim is:

1. The process for fluorinating a hydrocarbon or amide polymer to form a low energy fluorinated polymer surface substantially free of oxygen which comprises contacting a polymer with a cold plasma comprising ions and/or radicals of fluorinated species selected from the group consisting of fluorine, tetrafluoromethane, hydrogen fluoride, hexafluoroethane, sulfur hexafluoride, difluoromethane, trifluoromethane, and mixtures thereof, under conditions to effect substantially complete fluorination of the surface of said polymer without substantial degradation of said polymer.

2. The process of claim 1 wherein said plasma is generated with a radio frequency excitation.

3. The process of claim 1 wherein said fluorinated non-hydrogenated species is fluorine.

4. The process of any one of claims 1 through 3 wherein said polymer is polyethylene.

5. The process of any one of claims 1 through 3 wherein said polymer is polypropylene.

6. The process of any one of claims 1 through 3 wherein said polymer is a polyamide.

7. The process of any one of claims 1 through 3 wherein said polymer is placed within a Faraday cage during the reaction.

8. The process of any one of claims 1 through 3 wherein said polymer comprises particles.

9. The process of any one of claims 1 through 3 wherein said polymer comprises particles which form a fluidized bed during reaction.

* * * * *